Figure 4:
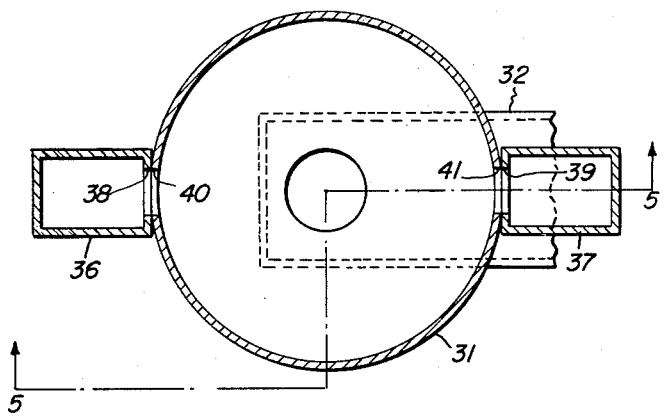

Nov. 10, 1964  P. N. HESS  3,156,879
POWER DIVIDER UTILIZING INDUCTIVE COUPLING IN A CAVITY
RESONATOR EXCITED IN THE $TM_{010}$ MODE
Filed July 6, 1960  2 Sheets-Sheet 1
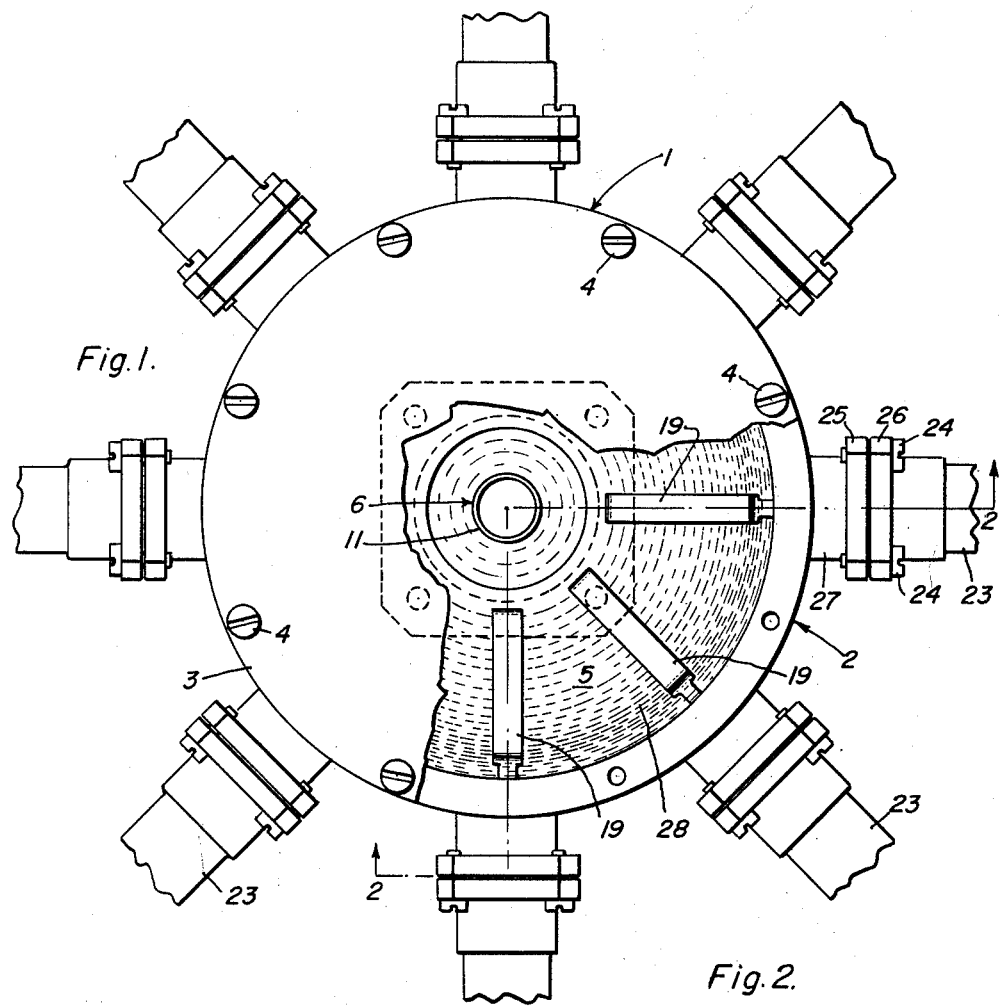
Fig. 1.
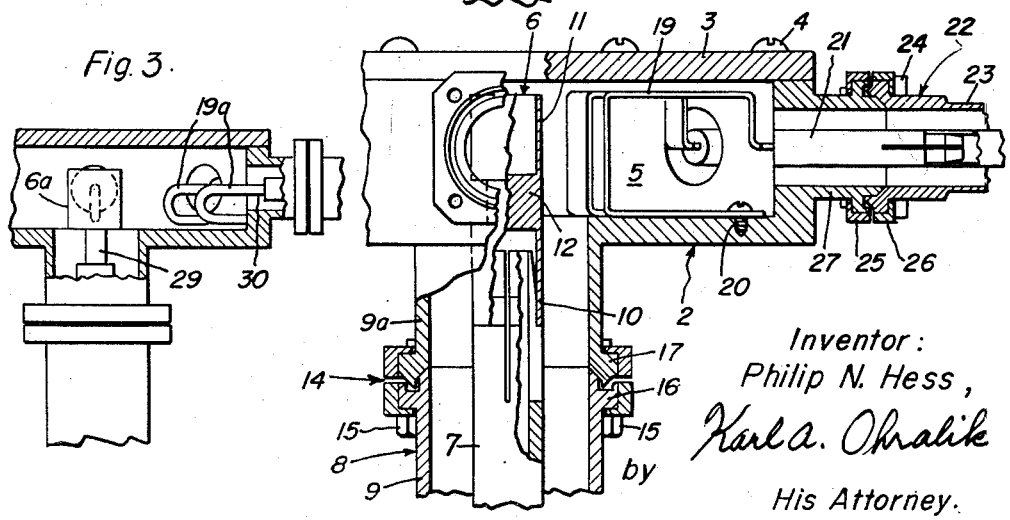
Fig. 2.
Fig. 3.
Inventor:
Philip N. Hess,
Karl A. Ohralik
by
His Attorney.

Nov. 10, 1964  P. N. HESS  3,156,879
POWER DIVIDER UTILIZING INDUCTIVE COUPLING IN A CAVITY
RESONATOR EXCITED IN THE TM$_{010}$ MODE
Filed July 6, 1960  2 Sheets-Sheet 2

Inventor:
Philip N. Hess,
by Karl A. Ohralik
His Attorney.

United States Patent Office 3,156,879
Patented Nov. 10, 1964

3,156,879
POWER DIVIDER UTILIZING INDUCTIVE COUPLING IN A CAVITY RESONATOR EXCITED IN THE $TM_{010}$ MODE
Philip N. Hess, Schenectady, N.Y., assignor to General Electric Company, a corporation of New York
Filed July 6, 1960, Ser. No. 41,208
6 Claims. (Cl. 333—6)

This invention relates to an electromagnetic wave energy coupling apparatus particularly useful to distribute electromagnetic wave energy of a predetermined frequency, from a single input line equally to a plurality of output lines.

Power dividers for distributing electromagnetic wave energy from a single line to a pair of other lines are known. Also, it is known to provide power dividers for transferring electromagnetic wave energy from a single line to or from a plurality of other lines at respective different frequencies by the provision of suitable oriented dipole radiators disposed within a cavity adapted to be resonant simultaneously at the different frequencies. However, in apparatus utilizing high frequency electromagnetic wave energy, it is at times important or necessary to simultaneously distribute energy from a single power line equally to a plurality greater than two other lines and at the same frequency within a relatively broad band of frequencies.

Accordingly, it is a principal object of my invention to facilitate the distribution of electromagnetic wave energy from a single power line equally to a relatively large plurality of other power lines and in which the energy transferred to each line is of the same frequency and to enable the reciprocal transfer of energy from the plurality of lines to the single line.

In accordance with one preferred embodiment of my present invention, a right circular cylindrical cavity, resonant at the frequency of the energy to be transferred, is excited in the $TM_{010}$ mode by a capacitive input coupling and for each output line, an inductive coupling to the cavity is made through the circular periphery of the resonator so as to couple to the magnetic field in the cavity. The inductive couplers are uniformly spaced about the periphery and are of the same size and proportions. The orientation of each of the couplers with respect to the magnetic field component within the cavity is the same. Since the magnetic field is circumferentially uniform, the power coupled out of the cavity at circumferentially spaced points is the same.

In accordance with one specific illustrated embodiment of my present invention utilizing coaxial type power lines, an input probe is provided centrally projecting into the cavity from one end thereof to provide a capacitive input coupling to the cavity and to excite it in the $TM_{010}$ mode. In such a mode of excitation, the instantaneous angular magnetic field is invariable longitudinally along the cavity and around its circumference but varies gradually from a minimum to a maximum along a radius from the axis of the cavity to a point near its periphery. This mode of excitation is exploited by the simultaneous, equal coupling to the magnetic field through a plurality of inductive coupling loops of substantially identical size and orientation, symmetrically disposed about the periphery of the cavity resonator equidistantly from the input probe. Each loop has one end conductively connected to one interior end wall of the resonator and its other end extending outwardly through the circular resonator wall for connection to an output line. Each loop is oriented so that the magnetic field passes through the loop. With such substantially identical size and orientation of the loops and the symmetrical spacing thereof, the coupling between the field and the respective coupling loops is equal to provide equal output power distribution to the several output lines.

In the case of another embodiment of my invention utilizing wave guides rather than coaxial lines, the input line is a rectangular wave guide having an opening in the wide wall thereof which opening is congruent with a central opening in an end wall of the cavity resonator and each output line is a rectangular wave guide coupling to the cavity through an opening in the narrow wall of the wave guide which is in communication with a congruent opening in the circular peripheral wall of the cavity resonator. In this arrangement, the input line is again capacitively coupled to the cavity and each output line is inductively coupled to the cavity. For uniform output coupling, the output lines are symmetrically spaced about the periphery of the cavity.

For increasing the effective band width of operation of the divider in the embodiment utilizing coaxial input and output lines, an effective series inductance may be introduced in the input line and in the output lines by making a portion of the input probe external to the cavity, of smaller cross-sectional dimension than the center conductor of the input line and by making a portion of the output coupling loops external to the cavity of conductors each having a cross-sectional area less than the cross-sectional area of the center conductor of the coaxial line.

Figure 5:
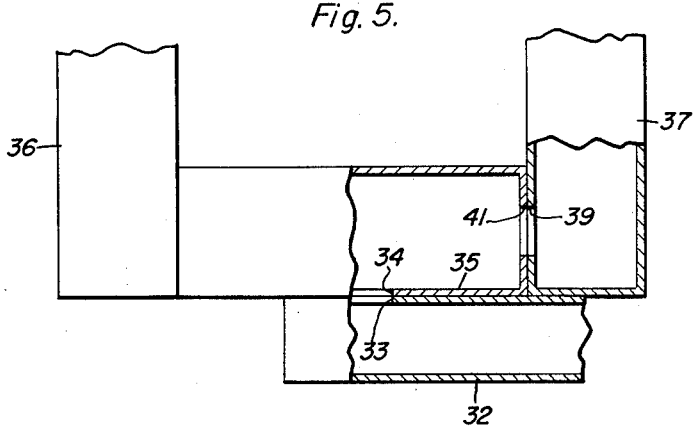

The novel features believed characteristic of my invention are set forth in the appended claims. The invention itself, together with further objects and advantages thereof, may best be understood with reference to the accompanying drawing in which:

FIGURE 1 is a partially cut-away plan view of a power divider according to my invention, FIGURE 2 is a partial side view of the power divider shown in FIGURE 1 and taken along section 2—2 of FIGURE 1, FIGURE 3 is a partial and sectional side view of a power divider according to a modification of my invention and showing coupling probe and loops with portions of decreased cross-sectional area, FIGURE 4 is a plan view in section of a power divider according to another embodiment of my invention and employing wave guides as electromagnetic wave energy propagating lines, and FIGURE 5 is an elevational view of the power divider shown in FIGURE 4 and partially in section taken along line 2—2 of FIGURE 4.

Referring now more particularly to the drawings, for detailed description of my invention, in FIGURES 1 and 2, the number 1 refers generally to an entire power divider of my invention which includes a hollow conductive enclosure 2 of a suitable, highly conductive metal having a removable end cover plate 3. The plate 3 may be removably attached to the enclosure 2 by a plurality of screws near the periphery thereof, such as shown at 4. With the end plate in attached position, a resonant cavity 5 is defined within the enclosure.

For introducing electromagnetic wave energy into cavity 5, a coupling probe 6 is provided and forms the end extension of the inner conductor 7 of a coaxial line 8 having an outer conductor 9. An extension 9a of the outer conductor of coaxial line 8 is formed integral with enclosure 2. The probe 6 comprises a tubular section 10 which telescopically fits over the end of the inner conductor 7, another tubular section 11 which projects into the cavity 5 and an intermediate portion 12 joining the two tubular sections 10 and 11. The probe 6 in the position shown extends along the axis of the cavity 5 and is in proximity to the end plate 3 to form a capacitive input coupling to the cavity. With this construction, propagation of electromagnetic wave energy along line 8 and probe 6 is effective to excite cavity 5 in the $TM_{010}$ mode.

In this mode of excitation, the magnetic field comprises field lines in closed, circumferential loops with no axial or radial magnetic field components. The coaxial line 8 is secured in position by a conventional coupling 14, including a plurality of bolts, two of which are shown at 15 for providing engagement between a pair of flanges 16 and 17 made integral with respective outer conductors 9 and 9a.

For abstracting energy from the cavity 5, a plurality of inductive coupling loops 19 are provided and are disposed symmetrically about the periphery of the cavity 5. Each loop is conductively joined to the enclosure 2 as by a screw shown at 20 in FIGURE 2 securing one end of the loop and the other end of each loop is conductively connected to an inner conductor such as 21, of a coaxial output power line shown generally at 22 and having an outer conductor 23. The coupling loops are shown as having a generally rectangular loop cross-section and as being made of generally flat or ribbon type of conductive wire. It is to be understood, however, that the loops may be of other contour such as circular and that the loop wire may be round, for example, rather than flat. The output coaxial lines are each maintained in position by the threaded engagement of a plurality of bolts such as shown at 24 extending through a pair of flanges 25 and 26 connected, respectively, to the outer conductor 23 and outer conductor 27 integral with the enclosure 2.

As noted hereinabove, the input probe 6, in the portion shown, is effective in response to propagation of electromagnetic wave energy of certain frequencies along coaxial line 8, to excite the cavity 5 in the $TM_{010}$ mode. In this mode the circumferential magnetic field component varies from a minimum value in the region of probe 6 to a maximum value along a radius extending from this probe to a point near the interior periphery of the enclosure 2. The magnetic field of the oscillations in the cavity includes flux lines extending circularly about the cavity and forming enclosed loops therein. There is no axial variation of magnetic field and there is also no variation in intensity of magnetic field circumferentially about the cavity. The magnetic field component is represented in FIGURE 1 of the drawing by the arcuate lines 28 which are shown as being more highly concentrated along an intermediate portion between the probe 6 and the outer periphery of the cavity. In such a position the magnetic field component extends through the loops 19 and is uniform around the circumference of the cavity 6 to provide an equal coupling to each of the individual loops 19 since the loops are of identical dimensions and orientation, preferably radially along the cavity 5.

In determining the relative positions of the probe 6 and the coupling loops 19, the loops are preferably first positioned about the cavity as shown and the depth of penetration of the probe 6 into the cavity and the probe diameter for proper matching is empirically determined by trial and error technique.

In accordance with another embodiment of my invention as shown in FIGURE 3 of the drawings, a power divider substantially as shown in FIGURES 1 and 2 is provided wherein the input probe designated 6a and the output coupling probes designated 19a are connected to the respective inner conductors of the power lines through portions of reduced cross-section as shown at 29 and 30, respectively, which extend to predetermined extents exteriorly of the cavity. In all other respects the power divider shown in FIGURE 3 is identical to that shown in FIGURES 1 and 2. The effect of the reduced portion of the inner conductor as shown at 29 and 30 is to effectively introduce series inductance into the power lines. The extent of the reduced portions determines the magnitude of inductance added to the line. The advantage derived from this construction is that the divider is provided with a greater band width characteristics whereby it is operable to effectively distribute the power from an input line to a plurality of output lines over a wider band of frequencies.

In accordance with still another embodiment of my invention as shown in FIGURES 4 and 5 of the drawings, the power divider is adaptable for operation with wave guide type of input and output lines. As shown schematically in these figures, the power divider comprises an enclosure 31 forming a resonant cavity and which is entirely analogous to the cavity 5 shown in FIGURES 1 and 2. Power is supplied to the cavity within enclosure 31 through an input wave guide 32 of the rectangular type which has an opening 33 in a wide wall thereof in communictaion with a congruent opening 34 in one end wall 35 of the enclosure 31. With this arrangement, the coupling to the cavity from wave guide 32 is capacitive and the cavity is again excited in the $TM_{010}$ mode whereby the magnetic component of the electromagnetic field in the cavity is circular and invariable axially and circumferentially. For abstracting energy from the cavity in this embodiment of my invention, a plurality of output wave guides such as shown at 36 and 37 is provided and these wave guides are symmetrically disposed with respect to each other about the enclosure 31 and each communicates with the cavity through an aperture in the narrow wall of the wave guide, such as shown at 38 and 39, and being congruent with respective apertures 40 and 41 in the interior wall of the enclosure 31. With this arrangement the wave guides 36 and 37 are inductively coupled to the cavity and the identical size of the wave guides, the identical sized coupling apertures and the symmetrical disposition of these wave guides when coupled to the cavity which is excited at the $TM_{010}$ mode, provides for equal and uniform propagation of energy out through the output wave guides. It is to be understood that although only two output wave guides are shown in FIGURES 4 and 5 of the drawing, a much larger plurality of such output wave guides may be employed. For uniform output power in the respective wave guides, it is required only that such output wave guides be of uniform size that they be coupled to the cavity through apertures of the same size and that all of the output wave guides employed be symmetrically disposed with respect to each other.

It is to be noted that the power dividers herein described are reciprocal in that the plurality of described output lines may be utilized as input lines to feed output power to the single line described above as an input line. A typical example of such use may be an arrangement wherein a multi-cavity magnetron is symmetrically and uniformly loaded at a plurality of locations to feed output energy along a like plurality of power lines. The power propagated along such lines may be supplied to the plurality of lines symmetrically disposed about the periphery of an above described power divider and combined within the cavity to be taken out through the centrally disposed power line.

From the foregoing it is seen that in accordance with my invention I have provided arrangements for the equal distribution of electromagnetic wave energy from a single power line to a plurality of output power lines by a novel and a simple apparatus. It is to be understood that the foregoing invention was described with respect to the embodiments which achieve equal output coupling to the respective power lines.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. Electromagnetic wave coupling apparatus for transferring electromagnetic wave energy in either direction between a plurality of electromagnetic wave guiding circuits and a single electromagnetic wave guiding circuit comprising a cylindrical resonator adapted to be excited in the $TM_{010}$ mode, an electromagnetic wave guiding circuit capacitively coupled to said resonator essentially on the axis thereof and a plurality of circuits equally inductively coupled to said resonator at circumferentially spaced points on said resonator so that the energy transferred divides evenly between said plurality of inductively coupled circuits when said resonator is energized in the $TM_{010}$ mode.

2. Electromagnetic wave coupling apparatus for transferring electromagnetic wave energy between a single electromagnetic wave guiding circuit and a plurality of electromagnetic wave guiding circuits comprising an enclosure having a right circular cylindrical cavity therein and means coupled to the interior of said cavity substantially on the axis thereof for exciting said cavity in the $TM_{010}$ mode at a predetermined frequency, a plurality of coupling loops each connected respectively with one of said plurality of electromagnetic wave guiding circuits symmetrically disposed within said enclosure and each having one end conductively connected to the interior of an end wall of said enclosure and the other end projecting through the cylindrical wall of said enclosure and disposed in a plane perpendicular to the magnetic field component of the wave in said cavity to transfer equal amounts of powers from said single wave guiding circuit to each of said plurality of wave guiding circuits.

3. Electromagnetic wave coupling apparatus for transferring electromagnetic wave energy from a single electromagnetic wave guiding circuit to a plurality of electromagnetic wave guiding circuits comprising an enclosure having a right circular cylindrical cavity therein, means including a coupling probe coupled to said single wave guiding circuit and projecting into said cavity along the axis thereof and spaced from one end wall of said enclosure, a plurality of coupling loops symmetrically disposed within said cavity and each having one end connected to an interior end wall of said cavity and the other end projecting externally through the circular wall of said enclosure and coupled respectively to one of said plurality of wave guiding circuits, each coupling loop being disposed in a plane substantially parallel to the axis of said enclosure whereby excitation of said cavity by electromagnetic wave energy of a predetermined frequency applied to said input probe is effective to excite said cavity in the $TM_{010}$ mode producnig uniform inductive coupling between said cavity and each of said coupling loops to provide equal power distribution from said input probe to said coupling loops.

4. Electromagnetic wave coupling apparatus for transferring electromagnetic wave energy from one electromagnetic wave guiding circuit to a plurality of electromagnetic wave guiding circuits comprising an enclosure having a right circular cylindrical cavity therein, an aperture in an end wall of said cavity along the axis thereof, a rectangular wave guide having an aperture in the wide wall thereof congruent with the aperture in said enclosure, a plurality of apertures in said enclosure in the circular wall thereof in spaced circumferential relation with respect to each other, a like plurality of rectangular wave guides each having an aperture in the narrow wall thereof and each being congruent with an aperture in the periphery of said enclosure whereby propagation of electromagnetic wave energy in said input wave guide at a predetermined frequency is effective to excite said cavity in the $TM_{010}$ mode and the energy within said cavity is distributed equally to said output wave guides.

5. Electromagnetic wave coupling apparatus for transferring electromagnetic wave energy between a single electromagnetic wave guiding circuit and a plurality of electromagnetic wave guiding circuits comprising an enclosure having a right circular cylindrical cavity therein, means for exciting said cavity and including a coupling probe coupled with said single electromagnetic wave guide circuit and extending within said cavity along the axis thereof, said probe being reduced in cross-section along a portion thereof extending externally of said cavity, a plurality of coupling loops disposed in circumferentially spaced relation within said cavity and each having one end connected to the interior end wall of said cavity and the other end projecting through said cylindrical wall coupled respectively with one of said plurality of electromagnetic wave guiding circuits, and end portion of each loop extending externally of said cavity being reduced in cross-section, whereby an effective series inductance is introduced in the coupling probe and coupling loops at said predetermined frequency.

6. Electromagnetic wave coupling apparatus in either direction between a single coaxial electromagnetic wave guiding circuit and a plurality of coaxial electromagnetic wave guiding circuits comprising an enclosure having a right circular cylindrical cavity therein, means including a coupling probe extending into said cavity along the axis thereof having one end terminating in spaced relation to one end wall thereof and the other end coupled to said single coaxial electromagnetic wave guiding circuit, a plurality of conductive coupling loops disposed in said cavity and each being in a plane parallel to and passing through the axis of said cavity, said loops being symmetrically disposed with respect to each other and each having one end connected to the inner conductor of said plurality of coaxial electromagnetic wave guiding circuits whereby electromagnetic wave energy transmitted though said cavity is equally distributed among said plurality of coaxial electromagnetic wave guiding circuits.

References Cited in the file of this patent

UNITED STATES PATENTS

| | | |
|---|---|---|
| 2,517,731 | Sproull | Aug. 8, 1950 |
| 2,752,495 | Kroger | June 26, 1956 |
| 2,782,383 | Olive | Feb. 19, 1957 |
| 2,801,389 | Linder | July 30, 1957 |

OTHER REFERENCES

Ragan: "Microwave Transmission Circuits," McGraw-Hill, Radiation Laboratory Series, 1948, Fig. 10.46 relied on.

Reich et al.: "Microwave Theory and Techniques," Van Nostrand, 1953, Fig. 9–20 relied on.